Dec. 1, 1959    L. T. ZITELLI    2,915,670
KLYSTRON AMPLIFIER
Filed July 22, 1954    4 Sheets-Sheet 1
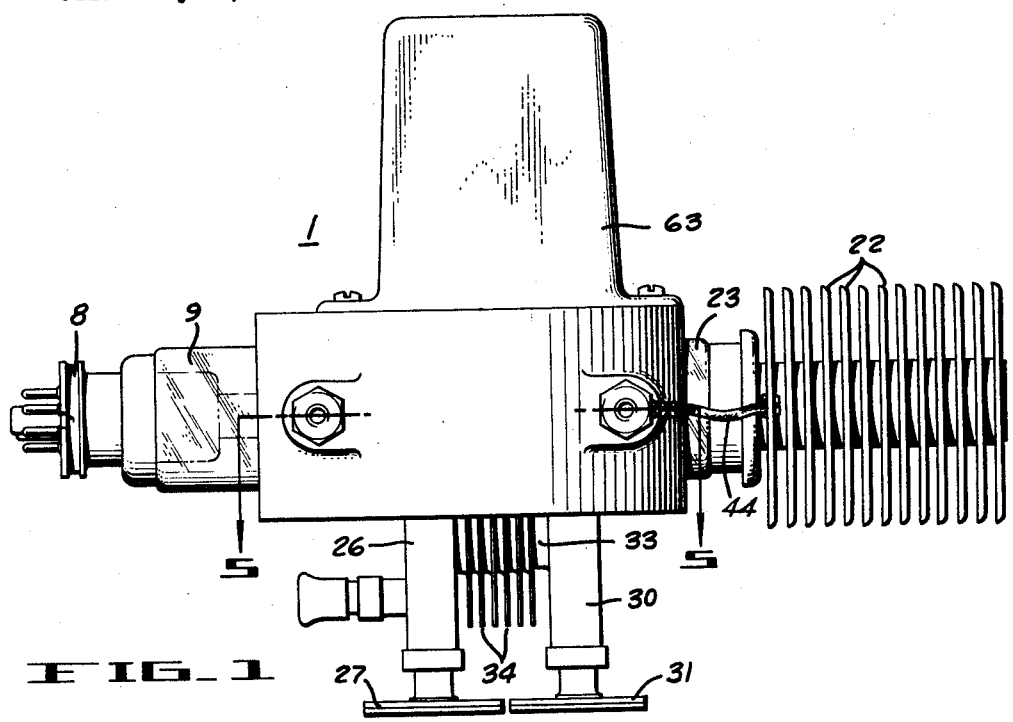
FIG_1
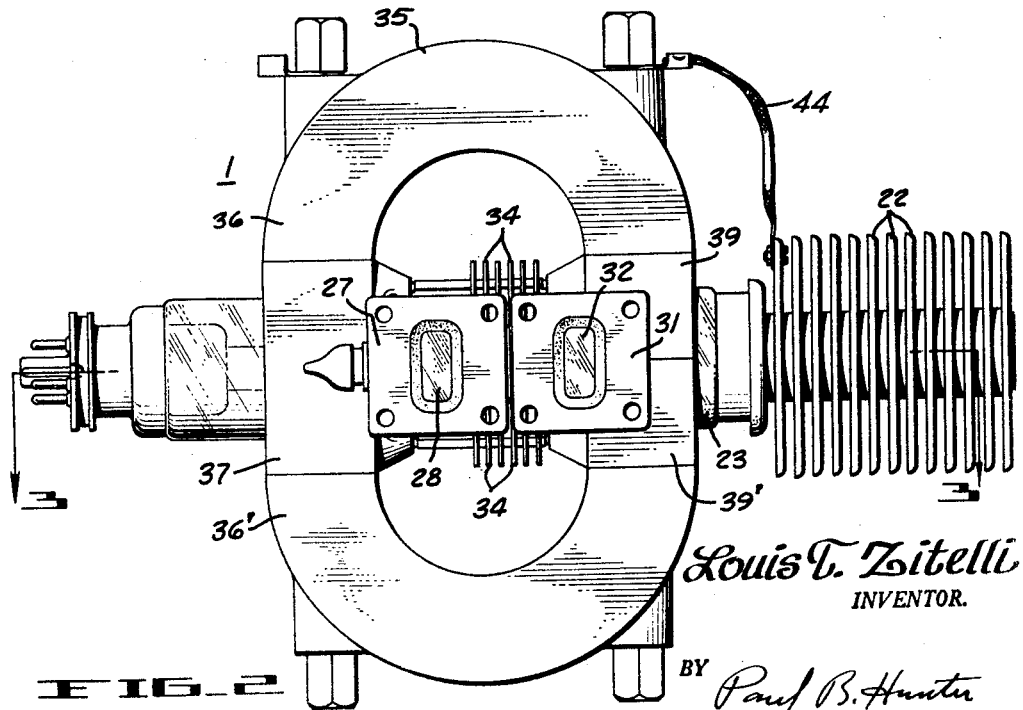
FIG_2
Louis T. Zitelli
INVENTOR.
BY Paul B. Hunter
ATTORNEY

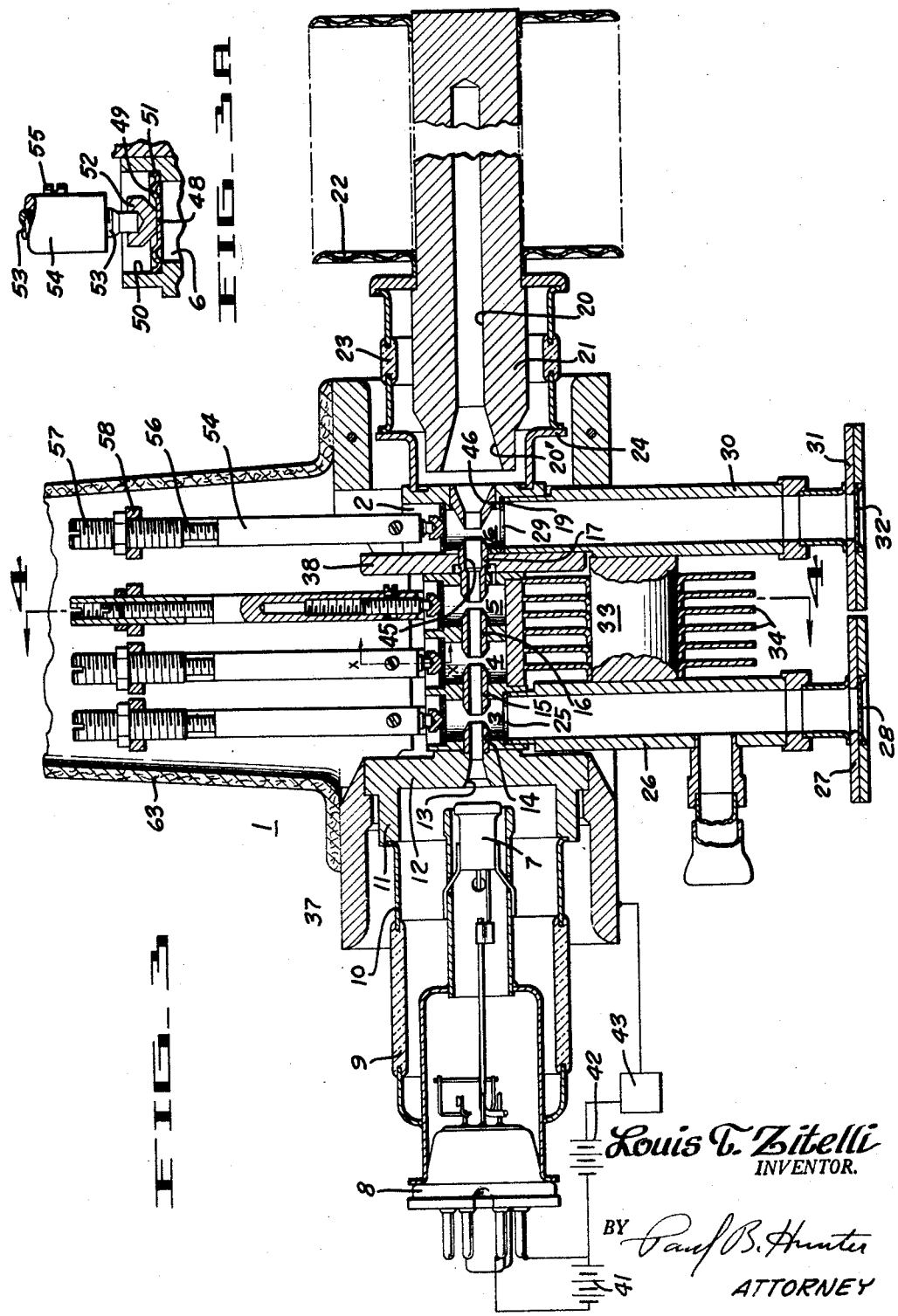

Dec. 1, 1959     L. T. ZITELLI     2,915,670
KLYSTRON AMPLIFIER
Filed July 22, 1954     4 Sheets—Sheet 3
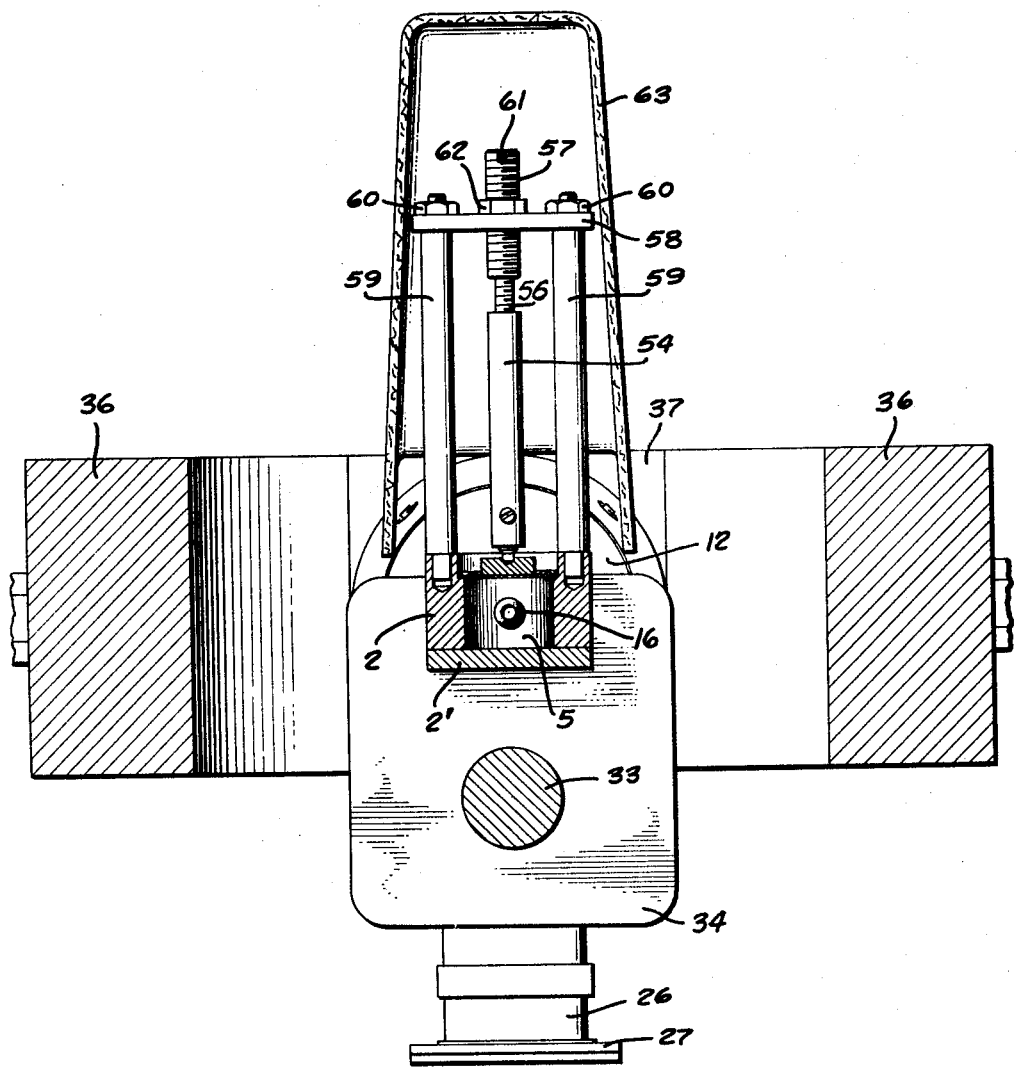
FIG_4
*Louis T. Zitelli*
INVENTOR.
BY *Paul B. Hunter*
ATTORNEY

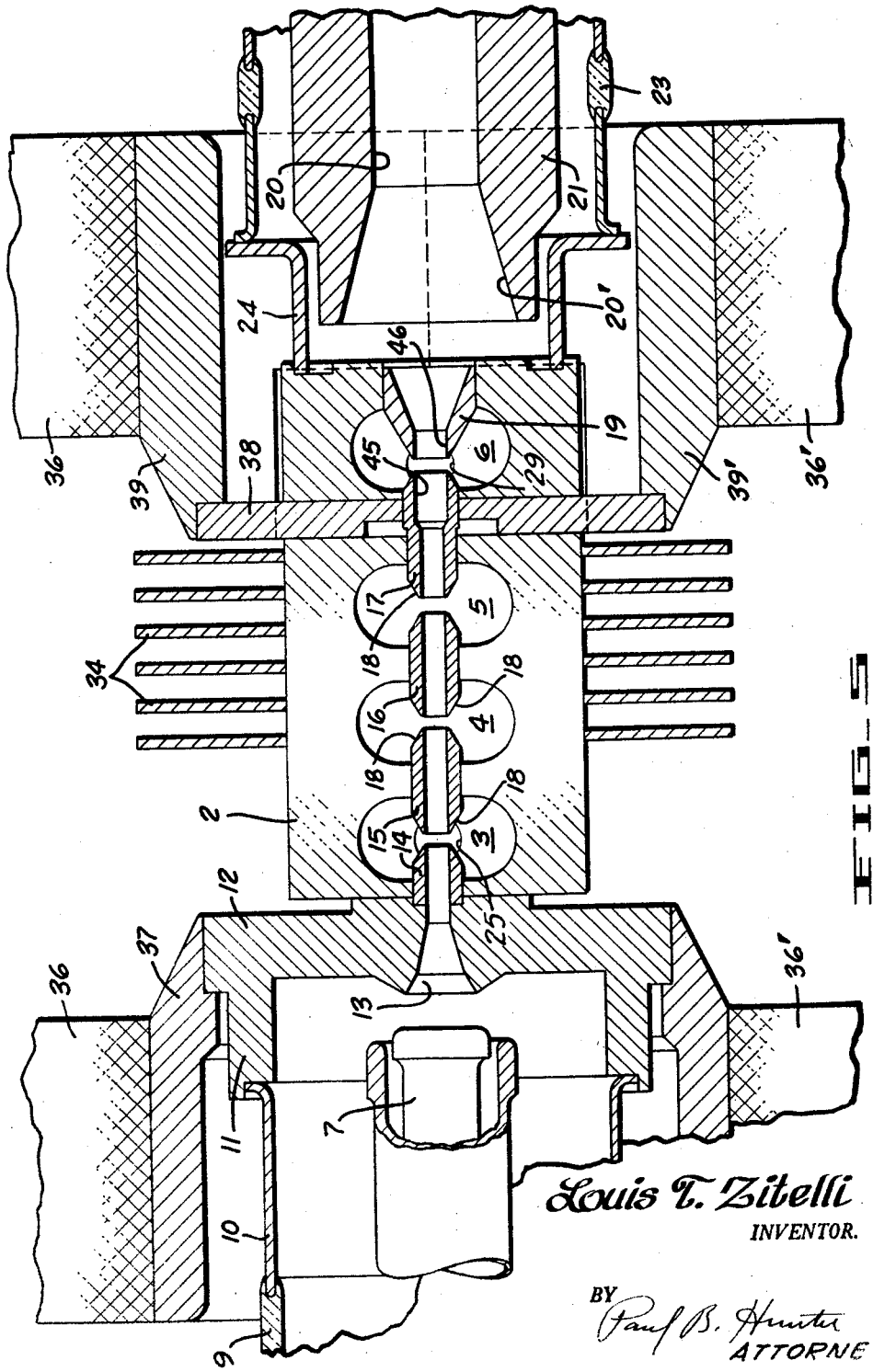

United States Patent Office 2,915,670
Patented Dec. 1, 1959

2,915,670

KLYSTRON AMPLIFIER

Louis T. Zitelli, Palo Alto, Calif., assignor to Varian Associates, San Carlos, Calif., a corporation of California Application July 22, 1954, Serial No. 445,095

10 Claims. (Cl. 315—5.35)

This invention relates generally to klystron amplifiers and the invention has reference more particularly to a novel high power and high gain pulsed klystron amplifier adapted for a variable duty cycle and which is especially suitable for fixed frequency transmitter use.

In many applications it is oftentimes desired as in radar use to employ a high gain pulsed amplifier of high power and fixed frequency. Heretofore, such transmitters have been generally unavailable as it has been difficult or impossible to combine all of these desired qualities in a single tube. For example, a high powered tube would often drift as to frequency or if the frequency was strictly controlled the output power and gain of the tube would be greatly limited.

It is therefore the principal object of the present invention to provide a novel pulsed klystron amplifier tube of high frequency stability and high power and gain charactertistics and which is adapted for a variable duty cycle.

Another feature of the invention is to provide a novel klystron tube of the above character having multicavities and providing means to substantially eliminate multipactor action due to the high radio frequency electric field in the output cavity.

Another feature of the invention is to provide a tube of the above character employing a focusing magnet for applying an axial focusing field to all cavities, with exception of the final output tube cavity, to aid in preventing the spread of the electron beam.

Another feature of the present invention is the provision of a plurality of relatively thin cavity resonators arranged for successive electromagnetic interaction with the beam of electrons passable therethrough whereby the focused length of the beam may be minimized and tuning of the cavities facilitated.

Another feature of the present invention is the provision of a novel tube body configuration including a certain quadraturally spaced arrangement of, cavity tuners, beam focus magnet, and communicating waveguides whereby the size, weight, and cost of the beam focus magnet may be minimized.

Other features and advantages of this invention will become apparent from the specification taken in connection with the accompanying drawings wherein the invention is embodied in concrete form.

In the drawings:

Fig. 1 is a plan view of the novel amplifier of the present invention,

Fig. 2 is a view of the elevation of the structure of Fig. 1,

Fig. 3 is an enlarged fragmentary sectional view taken along the line 3—3 of Fig. 2 looking in the direction of the arrows, Fig. 3(a) is an enlarged sectional view taken along the line X—X of Fig. 3, Fig. 4 is a part sectional view taken along the line 4—4 of Fig. 3, and Fig. 5 is an enlarged part sectional view taken along the line 5—5 of Fig. 1.

Similar characters of reference are used in the above figures to designate corresponding parts.

Referring now to the drawings, reference numeral 1 designates the novel multicavity klystron tube of this invention. This tube comprises body portion 2 (Figs. 4 and 5) which is shown as made out of a solid block having cavity resonators 3, 4, 5 and 6 machined out of the same and having a closure plate 2' (Fig. 4).

An emitter 7 (Fig. 3) of the focusing type is carried by a contact base member 8 that is supported in turn through insulating sleeve 9 and metallic sleeve 10 to an annular flange 11 provided on the accelerating electrode or anode 12 which anode is provided with a central tapered bore 13 that is aligned with the emitter 7. The emitter is supplied with heating current from source 41 whereas the anode is supplied with accelerating voltage from source 42 acting through pulse modulator 43.

The focused beam leaving the emitter 7 in use will flow through the tapered bore 13 conforming more or less to this bore and pass centrally through each of the resonators 3, 4, 5 and 6 in succession, these resonators being provided with drift tubes 14, 15, 16, 17 and 19 having central apertures aligned with the bore 13 for receiving the electron beam and providing operating gaps within each of the resonators. The ends of the drift tubes 14, 15, 16, 17 and 19 within the resonators have their opposed ends beveled at 18 (see especially Fig. 5) so that any secondaries emitted from these beveled ends within the resonators move normally with respect to the beveled end surfaces and fly off into the interior of the resonator without doing any harm. The A.C. fields present in resonators 3, 4 and 5 are insufficiently intense to cause electrons to bombard the opposed beveled ends of the adjacent drift tubes which bombardment would cause multipactor action and reduce the output power of the tube accordingly.

The beam after leaving the final cavity 6 passes through the re-entrant exit drift tube 19 and into the hollow interior bore 20 of a collector 21 shown as a solid block of copper. The bore 20 is shown having a flared entrance portion 20' for collecting any spreading electrons leaving the final or output resonator 6. The bore 20 is shown of considerable depth so that the beam can be collected over a relatively large area and this fact, together with the massive nature of the collector, tends to conduct the heat radially away from the inner portion of the collector and to a series of radial fins 22 provided on the exterior surface of the collector 21, which fins serve to radiate the heat generated into space. The collector 21 is shown supported through an insulating sleeve 23 upon a hollow tubular support 24 that is carried by the body 2 of the resonator. A lead 44 serves to maintain collector 21 at the voltage of the cavity block 2 in use.

The input cavity 3 (Fig. 3) is provided with a window or iris 25 that communicates with an input waveguide 26 which is shown of heavy copper construction making good thermal contact with the body 2. The outer end of the waveguide 26 is provided with an output flange 27 having a mica window 28, the said flange 27 being adapted to be bolted directly to a communicating waveguide. Similarly the last or output resonator 6 is provided with an output window or iris 29 communicating with a waveguide 30 that is also of heavy copper construction and is firmly attached to the body 2 in good thermal conductive relation. Similarly the outer end of waveguide 30 is provided with a coupling flange 31 having a mica window 32. The entire interior of the tube including emitter 7, the resonators 3, 4, 5 and 6, the collector cavity 20, and the waveguides 26 and 30 is evacuated in use.

Interposed between the input and output waveguides 26 and 30 there is provided a heavy copper block 33 in good thermal contact with these waveguides so that heat flowing from the body 2 in use through the heavy conducting walls of waveguides 26 and 30 will pass readily into the block 33 which block is provided on its exterior surface with a plurality of heat radiating fins 34, which fins also extend to cover a portion of the body 2 to aid in radiating heat directly from this body.

In order to prevent the spreading of the electron beam during its passage through the several resonators a focusing magnet is employed. This magnet 35 (Fig. 2) is shown as of the permanent type having two U-shaped legs or cores 36 and 36'. Corresponding ends of these legs, having like magnetic polarity, are connected to a ring member 37 of iron or other material of good magnetic conduction characteristics, which ring member is fixed to the outer periphery of the accelerating electrode 12 (Fig. 5) which is also of iron or other material of magnetic conducting characteristics. The ring member 37 together with the electrode 12 serves to set up an axial beam confining magnetic field extending through resonators 3, 4 and 5. Thus the electrode 12 serves as a pole piece for the magnet 35, the other pole piece being a washer or ring member 38 that is interposed between the resonator 5 and the final or output resonator 6. The pole piece 38 has a portion of its periphery embraced by magnet shoe members 39 and 39' which in turn are connected to the yokes 36 and 36' of the magnet.

Thus it will be seen that the axial magnetic field set up by the magnet 35 extends throughout resonators 3, 4 and 5 but does not enter the final or output resonator 6 of the amplifier. This is highly desirable and it is an important feature of this invention for two reasons. Firstly, it enables the reduction in the width of the magnet gap resulting in a substantial saving in magnet weight and size. It is to be borne in mind that for a given field strength of say 1200 gauss the magnet weight varies substantially as the cube of its gap length so in the present tube if the gap were made wide enough to include the final resonator 6 to maintain the same axial magnetic field it would be necessary to substantially double the weight of the magnet in this case which is undesirable inasmuch as reduction of weight is important, especially in radar use.

Also, it should be appreciated that owing to the high power output of this tube, i.e., of the order of 5 kilowatts or more, the radio frequency field in final resonator 6 is extremely large so that if the axial magnetic field extended also through this cavity, multipactor action would take place between the beveled edges 18 of the drift tubes 17 and 19. As previously indicated, secondary electrons leaving the beveled surfaces 18 would ordinarily move normally to the surface of these bevels and hence would move outwardly into the resonator without doing any particular damage. However, in the presence of a strong axial magnetic field such as would be set up by the magnet 35 acting in combination with the strong radio frequency field present in output resonator 6, these secondaries would be bent inwardly and would move from one beveled surface 18 to the opposite beveled surface 18 thereby setting up additional secondaries so that severe multipactor action would take place causing a rapid dropoff in the power output of the tube. Inasmuch as there is no magnetic field focusing taking place in resonator 6 the beam tends to expand therein. In order to provide for a slightly enlarged beam in this area the outer portion of drift tube 17 has its interior bore of enlarged diameter as indicated at 45 in the drawings and similarly the inner bore of the drift tube 19 is of enlarged diameter as indicated at 46 in the drawings.

Thus, since the beam does not have time to appreciably expand between resonators 5 and 6, it is only necessary to provide for a slight increase in bore diameter resulting in good coupling between the beam and the field of resonator 6 while at the same time multipactor action which would otherwise take place between the beveled edges 18 of the drift tubes 17 and 19 is eliminated owing to the elimination of the strong axial magnetic field in this final resonator. The combination of these features, i.e., the increased diameter of the bore of the drift tube in the region of resonator 6 together with the advantageous reduction in the magnet size obtained by limiting the magnet gap to the first three resonators of the tube results in a considerable increase in the power output of the tube, bearing in mind that the tube thus produced having four cavities is capable of a power amplification of approximately 1,000,000. No grids are used in connection with the cavities because of the high operating power level of the tube and such is unnecessary owing to the use of the focusing emitter together with the magnetic focusing field and the use of small bores in the drift tubes so that good coaction takes place between the beam and the resonator fields without the use of grids.

The resonators are each adapted to be independently tuned by a novel compensating tuning structure now forming the subject matter of a divisional application and consisting of an inductive side wall tuner comprising a flexible substantially oval-shaped disk 48 (see especially Figs. 3 and 3(a)). The disk 48 is shown provided with a substantially oval-shaped corrugation or ridge 49 to enhance the flexibility thereof, the said disk having a peripheral flange 51 adapted to be set and sealed within a stepped opening 50 provided in the side wall of the cavity such as cavity 6, for example. The disk 48 is retained within the stepped aperture 50 as by brazing and has a pedestal or shoe member 52 secured to its central portion as by brazing. A screw 53 as of stainless steel projects into and is brazed within a recess provided in the shoe 52 and extends outwardly from this shoe and is threaded into an aluminum rod 54. A set screw 55 may be used to secure the screw 53 in adjusted position within the rod 54. The exterior of the outwardly projecting end portion of rod 54 is threaded at 56 and extends into a threaded interior bore of a screw sleeve 57 as of stainless steel which sleeve in turn is threaded through the central portion of a header or cross bar 58 (Fig. 4) that has its outer end portions fixedly carried by the outer ends of spaced molybdenum rods 59 and 59'. The rods 59 and 59' have their inner ends secured within suitable recesses provided in the body 2 (see especially Fig. 4) and are shown as having reduced threaded outer ends provided with nuts 60 for retaining the cross bar 58 in place upon the rods 59 and 59'.

The outer end of screw sleeve 57 is provided with a screwdriver slot 61 for screwing this sleeve inwardly and outwardly of the header 58 and at the same time inwardly and outwardly with respect to the aluminum rod 54, the exterior threads of sleeve 57 and of the rod 54 at 56 being of slightly different pitch whereby a differential screw action takes place resulting in minute longitudinal movements of rod 54 as the screw sleeve 57 is turned thereby providing a very sensitive tuning of the resonator through movement of the flexible disk 48. Thus when it is desired to tune the resonators to match each other or to vary the tube frequency, the several screw sleeves 57 are adjusted to obtain the desired tuning whereupon lock nuts 62 may be tightened holding the desired tuning. Owing to the use of the molybdenum rods 59 and 59' and the cross bars 58 in conjunction with the aluminum rod 54 a rugged and dependable automatic temperature compensation device is provided which compensates automatically for changes in dimensions of the tube due to temperature variations of the tube and of the ambient atmosphere.

Thus as the tube heats up in use which heating would tend to enlarge the cavities 3, 4, 5 and 6, and hence lower the output frequency of the tube, the differential in thermal expansion between the aluminum rod 54 and the molybdenum rods 59 and 59' results in inward movement of the diaphragm or disk 48 tending to reduce the size of the respective resonator and hence automatically compensating for increased temperature. In order to more closely associate the temperature compensating device with the temperature of the tube body in use, a removable cover 63 as of plastic or plastic glass fiber combination is provided removably attached to the tube body and encloses the tuning mechanism. Thus, with the cover 63 in place the temperature of the tube body and the compensating device is substantially the same so that automatic tuning compensation is provided for changes in temperature whereby the output of the tube is maintained at substantially fixed frequency. The molybdenum rods 59 and 59' having a very low thermal coefficient of expansion whereas the aluminum rod 54 having a high coefficient of expansion results in the desired compensating action.

Since the cavities 3, 4, 5 and 6 are machined out of solid block material such as copper the body portion 2 has good heat conducting characteristics and quickly conveys away excess heat. From a study of Fig. 5 it will be seen that each of these cavities can be produced by drilling or machining two holes side by side and somewhat spaced apart and then removing the metal between the two holes as by a milling cutter so that each resonator has a piar of opposed concave walls and a pair of opposed substantially flat walls, one of the flat walls having the flexible tuning diaphragm or disk 48 therein.

Moreover, the particular characteristic shape and arrangement of the cavities 3, 4, 5 and 6 shown particularly in Figs. 4 and 5 facilitates beam focusing since the cavity thickness dimension in the direction of beam travel is made less than either of the transverse dimensions of the cavity in order to closely space the cavities in the direction of the beam thereby achieving the advantage that the overall focused length of the beam is minimized thereby minimizing size and weight of the beam focus magnet.

In addition, the cavities are further characterized (see Fig. 4) by the tuner diaphragm being disposed in the cavity closing wall defining a height dimension, which height is made less than the other transverse width dimension, whereby the inherent advantage is obtained that a given movement of the inductive tuning diaphragm has an enlarged effect on tuning of the cavity.

The physical configuration of the tube (see Fig. 4) wherein the cavity tuners 54 and both communicating waveguides 26 and 30 are directed outwardly of the tube body in approximately quadraturally spaced planes from the plane of the beam focus magnet yoke 36 and 36' has the advantage that the magnetic yoke is allowed to be symmetrically disposed with respect to the beam path whereby the size and weight of the beam focus magnet is further minimized.

The novel tube of this invention in use is extremely valuable in connection with fixed frequency transmitter applications. A typical tube operating at X-band frequency is shown to provide a gain of 55 db and delivers in excess of 5 kw. of pulsed power into a matched load.

Since many changes could be made in the above construction of the novel klystron amplifier of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A multistage klystron amplifier comprising a tube body having a plurality of resonator cavities therein, said cavities having drift tubes establishing reaction gaps within the respective resonators, an emitter for projecting an electron beam through said drift tubes and cavities in succession, a hollow collector electrode positioned after the last cavity for receiving the electron beam, and a magnet coupled to said tube body and having pole pieces disposed adjacent the first of said resonators and between the last and the next to the last of said resonators whereby a magnetic focusing field is set up at all of said resonators with the exception of the output resonator.

2. A multistage klystron amplifier as defined in claim 1 wherein said drift tubes are formed with opposed beveled outside surfaces to reduce multipactor action.

3. A klystron amplifier comprising a plurality of independent cavities, means for passing an electron beam through said cavities in succession, means for applying a beam confining magnetic field to a plurality of said independent cavities, and the cavity most remote from the source of electrons being disposed substantially out of the focusing magnetic field whereby secondary electrons emitted from opposing portions of said last cavity are allowed to fly off into adjacent spaces rather than being constrained by the focusing magnetic field to bombard opposing cavity portions and produce unwanted multipactor action.

4. A multicavity klystron amplifier comprising, means for producing a pencil like beam of electrons, a body portion having a plurality of evacuated cavities therein, said cavities arranged for successive interaction with said pencil like beam of electrons passable therethrough, said body portion being of block construction for conducting heat readily from the resonators therewithin, the interior of each of said cavities being shaped substantially like a modified truncated right cylinder of oval cross section having curved side walls of semicylindrical shape separated by flat side wall portions and having flat top and bottom walls closing the ends of said cavity, and a flexible oval tuning diaphragm mounted in one of said flat closing walls.

5. A klystron amplifier including, means forming a beam of electrons, at least four independent cavity resonators arranged at intervals along the beam path for successive electromagnetic interaction with said beam of electrons passable therethrough, means for providing a beam confining magnetic field directed axially of said electron beam and passing through at least the first three independent cavity resonators, and the cavity resonator of said plurality of independent cavities disposed most remote from the source of electrons being disposed substantially out of the axial beam confining magnetic field whereby secondary electrons emitted from opposing portions of said last cavity are allowed to fly off into adjacent spaces rather than being constrained by the beam confining magnetic field to bombard opposing cavity portions and produce unwanted multipactor action.

6. A multicavity klystron amplifier comprising, means for producing a pencil like beam of electrons, a body portion having a plurality of evacuated cavities therein, said cavities arranged for successive interaction with said pencil like beam of electrons passable therethrough, said body portion being of block construction for conducting heat readily from the resonators therewithin, a plurality of said successive cavities having inside height and width characteristic dimensions transverse to the direction of beam travel, the height of the said cavities being less than the width thereof, and each of said cavities having a maximum thickness dimension parallel to the direction of beam travel which is less than the height of said cavities whereby the length of said body portion required to accommodate said cavity resonators may be minimized.

7. The apparatus according to claim 6 including, a movable tuning diaphragm mounted within at least one of said cavity resonators for varying said height dimension of said resonator to effect tuning of said cavity resonator.

8. The apparatus according to claim 7 wherein said tuning diaphragm is vacuum sealed at its periphery to said cavity resonator, and an oval corrugation in said diaphragm to facilitate flexure thereof in use.

9. A multicavity klystron amplifier comprising a body portion having a plurality of cavities therein, said body portion being of block construction for conducting heat readily from said resonators therewithin, waveguides affixed to said body portion and communicating with first and last resonators thereof, said waveguides projecting outwardly of said body in approximately the same direction in spaced relation and having means at their outer ends for coupling two standard wave guides, means for tuning said cavity resonators affixed to said body portion, said tuning means projecting outwardly of said body portion in approximately the opposite direction from said projecting waveguides, and a beam focus magnet assembly affixed to said body portion and projecting outwardly of said body in a direction approximately at right angles to both said waveguides and said tuning means.

10. The apparatus according to claim 9 wherein said focus magnet structure projects outwardly of said body portion on opposite sides thereof.

References Cited in the file of this patent

UNITED STATES PATENTS

| | | |
|---|---|---|
| 2,109,880 | Dow | Mar. 1, 1938 |
| 2,197,652 | Statz et al. | Apr. 16, 1940 |
| 2,409,608 | Anderson | Oct. 22, 1946 |
| 2,444,435 | Fisk | July 6, 1948 |
| 2,466,922 | Wax | Apr. 12, 1949 |
| 2,496,378 | Coeterier | Feb. 7, 1950 |
| 2,606,302 | Learned | Aug. 5, 1952 |
| 2,619,611 | Norton et al. | Nov. 25, 1952 |
| 2,653,271 | Woodyard | Sept. 22, 1953 |
| 2,720,628 | Kumpfer | Oct. 11, 1955 |